United States Patent
DeLuca

(10) Patent No.: US 11,961,218 B2
(45) Date of Patent: Apr. 16, 2024

(54) MACHINE VISION SYSTEMS AND METHODS FOR AUTOMATICALLY GENERATING ONE OR MORE MACHINE VISION JOBS BASED ON REGION OF INTERESTS (ROIS) OF DIGITAL IMAGES

(71) Applicant: ZEBRA TECHNOLOGIES CORPORATION, Lincolnshire, IL (US)

(72) Inventor: Anthony P. DeLuca, Holbrook, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 251 days.

(21) Appl. No.: 17/388,786

(22) Filed: Jul. 29, 2021

(65) Prior Publication Data

US 2023/0030779 A1 Feb. 2, 2023

(51) Int. Cl.
*G06T 7/00* (2017.01)
*G06N 20/20* (2019.01)
(Continued)

(52) U.S. Cl.
CPC .......... *G06T 7/0004* (2013.01); *G06N 20/20* (2019.01); *G06T 1/0014* (2013.01); *G06V 10/25* (2022.01);
(Continued)

(58) Field of Classification Search
CPC ................. G06T 7/0004; G06T 1/0014; G06T 2207/20081; G06T 2207/30141; G06N 20/20; G06V 10/25
See application file for complete search history.

(56) References Cited

U.S. PATENT DOCUMENTS 10,706,535 B2 * 7/2020 Arar ..................... G06V 20/695
11,497,557 B2 * 11/2022 Haslam ................. G06T 7/0012
(Continued)

FOREIGN PATENT DOCUMENTS

KR 1020200142914 A 12/2020
WO 2021066821 A1 4/2021

OTHER PUBLICATIONS

Ren et al. "Faster R-CNN: Towardsreal-Time Object Detection with Region Proposal Networks." In: Cornell University Lubrary/Computer Science/Computer Vision and Patern Recognition, Jan. 6, 2016,[online][retrieved on Sep. 14, 2022 (14.09.20220] Retrieved from the Internet <URL:https:arxiv.org/abs/150601497., entire document.

(Continued)

*Primary Examiner* — Pinalben Patel
(74) *Attorney, Agent, or Firm* — Yuri Astvatsaturov

(57) ABSTRACT

Machine vision systems and methods for automatically generating machine vision job(s) based on region of interests (ROIs) of digital images are disclosed herein. The systems and methods comprise configuring a machine vision tool for capturing an image ID depicted in training images and labeling each training image to indicate a success or failure status of an object depicted by the training images. Candidate image feature(s) are extracted from the training images for generation of candidate ROI(s). A training set of ROIs are selected from the candidate ROI(s) and are designated as an included or excluded ROIs. The training set of ROIs and the training images are used to train a vision learning model configured to output a machine vision job deployable to an imaging device that implements the machine vision job to detect the success or failure statuses of additional image(s) depicting the object.

15 Claims, 4 Drawing Sheets

(51) Int. Cl.
*G06T 1/00* (2006.01)
*G06V 10/25* (2022.01)

(52) U.S. Cl.
CPC ............... *G06T 2207/20081* (2013.01); *G06T 2207/30141* (2013.01)

(56) References Cited

U.S. PATENT DOCUMENTS

| | | | | |
|---|---|---|---|---|
| 11,636,592 | B2* | 4/2023 | Shoshan | G06V 10/764 382/128 |
| 11,636,664 | B2* | 4/2023 | Li | G06F 18/214 382/128 |
| 2015/0055855 | A1* | 2/2015 | Rodriguez | G06V 10/774 382/155 |
| 2017/0082555 | A1 | 3/2017 | He et al. | |
| 2018/0101949 | A1* | 4/2018 | Wang | G06T 7/136 |
| 2019/0139642 | A1 | 5/2019 | Roberge et al. | |
| 2019/0236767 | A1 | 8/2019 | Hu et al. | |
| 2020/0193206 | A1 | 6/2020 | Turkelson et al. | |
| 2020/0334577 | A1* | 10/2020 | Anderson | G06Q 10/063 |
| 2020/0364841 | A1 | 11/2020 | Hino et al. | |
| 2021/0142456 | A1 | 5/2021 | Varga et al. | |

OTHER PUBLICATIONS

International Search Report and Written Opinion for International Application No. PCT/US2022/31525 dated Oct. 28, 2022.

* cited by examiner

MACHINE VISION SYSTEMS AND METHODS FOR AUTOMATICALLY GENERATING ONE OR MORE MACHINE VISION JOBS BASED ON REGION OF INTERESTS (ROIS) OF DIGITAL IMAGES

BACKGROUND

Over the years, Industrial Automation has come to rely heavily on Machine Vision components capable of assisting operators in a wide variety of tasks. In some implementations, Machine Vision components, like cameras, are utilized to track objects, like those which move on a conveyor belt past stationary cameras. Often, these cameras (also referred to as Imaging devices) interface with client devices (e.g., personal computers) which run corresponding applications operable to interact with these imaging devices at a wide variety of levels. In these applications, image manipulation and analysis is often routine and that includes user interaction through the use of multiple regions of interest (ROIs) within those images.

A problem arises, however, when setting up or otherwise configuring machine vision components and/or software to accurately image objects, and, especially moving objects. Such moving objects may include objects (e.g., products being manufactured) moving on conveyor belt. In such situations, machine visions components and/or software typically requires manual or custom configuration, which can not only be time consuming, but also error prone.

In some aspects, machine vision components and/or software may be manually configured as a specific "job" for imaging a specific object (e.g., a barcode of a manufactured product or otherwise portion of a manufactured product) in a specific environment (e.g., conveyer belt or otherwise manufacturing process). However, manually creating a job can, in and of itself, be a time-consuming process. Typically, user must carefully identify ROIs within images for potential defects and set machine vision jobs accordingly for deviations to be detected. Such users must also manually specify regions for important features, such as barcodes.

Accordingly, there is a need for machine vision systems and methods for automatically generating one or more machine vision jobs based on ROIs of digital images

SUMMARY

In an aspect, the present disclosure describes an inventive machine vision method for automatically generating one or more machine vision jobs based on region of interests (ROIs) of digital images. The machine vision method comprises configuring a machine vision tool for capturing an image identifier (ID). The machine vision method further comprises loading a plurality of training images. Each training image may depict the image ID. The machine vision method further comprises labeling each of the plurality of training images to indicate a success status or a failure status of an object depicted within each training image. The machine vision method further comprises extracting one or more candidate image features from the plurality of training images. The machine vision method further comprises generating one or more candidate ROIs based on the candidate image features. The machine vision method further comprises selecting a training set of ROIs from the one or more candidate ROIs. Each ROI of the training set of ROIs may be designated as an included ROI or an excluded ROI. The machine vision method further comprises training, with the training set of ROIs and the plurality of training images, a vision learning model. The vision learning model may be configured to output a machine vision job. The machine vision job may be configured for electronic deployment to an imaging device. The imaging device, implementing the machine vision job, can be configured to detect the success status or the failure status of additional images depicting the object.

In an additional aspect, a machine vision system is disclosed. The machine vision system is configured to automatically generate one or more machine vision jobs based on ROIs of digital images. The machine vision system comprising an imaging device configured to implement one or more machine vision jobs. The machine vision system further comprises one or more processors. The machine vision system further comprises a memory communicatively coupled to the one or more processors and storing computing instructions. The computing instructions, that when executed by the one or more processors, cause the one or more processors to configure a machine vision tool for capturing an image ID. The computing instructions, that when executed by the one or more processors, further cause the one or more processors to load a plurality of training images. Each training image may depict the image ID. The computing instructions, that when executed by the one or more processors, further cause the one or more processors to label each of the plurality of training images to indicate a success status or a failure status of an object depicted within each training image. The computing instructions, that when executed by the one or more processors, further cause the one or more processors to extract one or more candidate image features from the plurality of training images. The computing instructions, that when executed by the one or more processors, further cause the one or more processors to generate one or more candidate ROIs based on the candidate image features. The computing instructions, that when executed by the one or more processors, further cause the one or more processors to select a training set of ROIs from the one or more candidate ROIs. Each ROI of the training set of ROIs may be designated as an included ROI or an excluded ROI. The computing instructions, that when executed by the one or more processors, further cause the one or more processors to train, with the training set of ROIs and the plurality of training images, a vision learning model. The vision learning model may be configured to output a machine vision job. The machine vision job may be configured for electronic deployment to the imaging device. The imaging device, implementing the machine vision job, can be configured to detect the success status or the failure status of additional images depicting the object.

In a still further aspect, a tangible, non-transitory computer-readable medium storing computing instructions for automatically generating one or more machine vision jobs based on ROIs of digital images is disclosed. The computing instructions, when executed by one or more processors, cause the one or more processors to configure a machine vision tool for capturing an image ID. The computing instructions, when executed by one or more processors, further cause the one or more processors to load a plurality of training images. Each training image may depict the image ID. The computing instructions, when executed by one or more processors, further cause the one or more processors to label each of the plurality of training images to indicate a success status or a failure status of an object depicted within each training image. The computing instructions, when executed by one or more processors, further cause the one or more processors to extract one or more candidate image features from the plurality of training images. The computing instructions, when executed by one or more processors, further cause the one or more processors to generate one or more candidate ROIs based on the candidate image features. The computing instructions, when executed by one or more processors, may further cause the one or more processors to select a training set of ROIs from the one or more candidate ROIs. Each ROI of the training set of ROIs may be designated as an included ROI or an excluded ROI. The computing instructions, when executed by one or more processors, further cause the one or more processors to train, with the training set of ROIs and the plurality of training images, a vision learning model. The vision learning model may be configured to output a machine vision job. The machine vision job may be configured for electronic deployment to an imaging device. The imaging device, implementing the machine vision job, can be configured to detect the success status or the failure status of additional images depicting the object.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate aspects of concepts that include the claimed invention, and explain various principles and advantages of those aspects.

Figure 1:
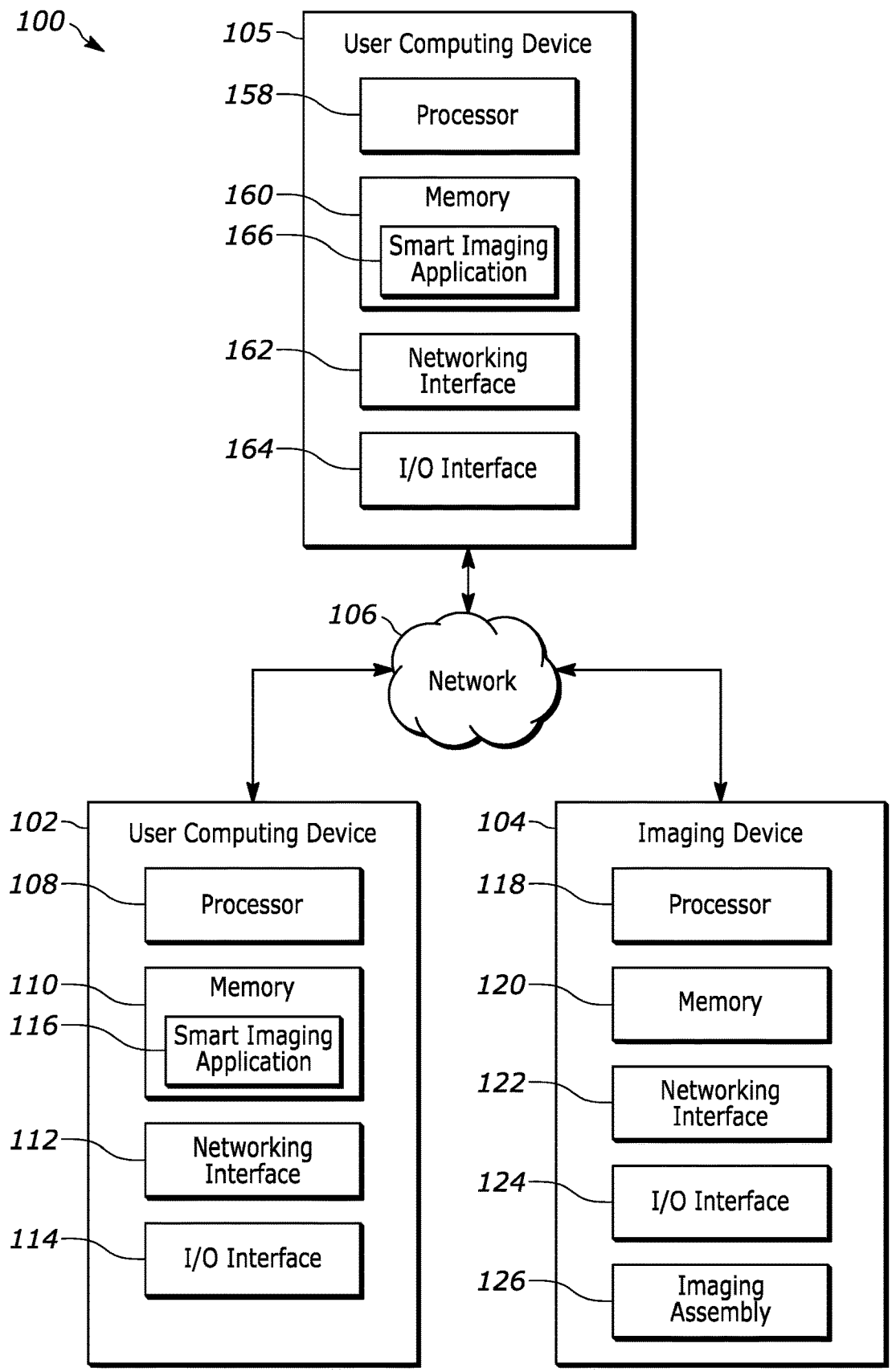
FIG. 1 is an example machine vision system configured to automatically generate one or more machine vision jobs based on ROIs of digital images, where the one or more machine vision jobs are deployable to an imaging device, in accordance with aspects described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of aspects of the present invention.

The apparatus and method components have been represented where appropriate by conventional symbols in the drawings, showing only those specific details that are pertinent to understanding the aspects of the present invention so as not to obscure the disclosure with details that will be readily apparent to those of ordinary skill in the art having the benefit of the description herein.

DETAILED DESCRIPTION

Machine vision systems and methods for automatically generating machine vision job(s) based on region of interests (ROIs) of digital images are disclosed herein. Generally, the disclosure herein provides a novel way to train a machine learning model for machine vision job(s) given a set of passing and failing instances (as depicted within digital images), as well as automatically extracting useful components for analysis. As the term is used herein, a "machine vision job" or otherwise "job" refers to imaging and/or camera software or firmware configured for deployment and implementation on an imaging camera such as any one or more of the VS-SERIES smart cameras as provided by ZEBRA TECHNOLOGIES CORP., such as the VS70 MACHINE VISION SMART CAMERA device. For example, in one aspect a machine vision job may be configured for deployment to an imaging camera to read or scan on an image of a barcode of a product. Configuring the machine vision job may include selecting ROIs in the image, such as a computer chip location in the image of a computer circuit board to indicate success (e.g., a success status) or failure (e.g., a failure status) of the computer circuit board during or after manufacture. Such activity can occur, for example, as part of a manufacturing quality control process. In various aspects, the machine vision job may be generated, setup, or otherwise output by a vision learning model (e.g., a machine learning model). These and other aspects of the disclosure are described further with respect to the Figures herein.

FIG. 1 is an example machine vision system 100 configured to automatically generate one or more machine vision jobs based on ROIs of digital images, where the one or more machine vision jobs are deployable to an imaging device 104, in accordance with aspects described herein. In various aspects, the machine vision system 100 provides analysis of pixel data of an image of a target object generation of a machine vision job, in accordance with various aspects disclosed herein.

In the example aspect of FIG. 1, the imaging system 100 includes a user computing device 102 (e.g., a computer, mobile device, or a tablet), a control computing device 105 (e.g., a programmable logic controller (PLC)), and an imaging device 104 communicatively coupled to the user computing device 102 and the control computing device 105 via a network 106. Generally, the user computing device 102 and the imaging device 104 may configure to execute instructions to, for example, implement operations of the example methods described herein, as may be represented by the flowcharts of the drawings that accompany this description. The user computing device 102 is generally configured to enable a user/operator to create a machine vision job for execution on the imaging device 104. When created, a user/operator may then transmit/upload the machine vision job to the imaging device 104 via the network 106, where the machine vision job is then interpreted, executed, or otherwise implemented by the imaging device 104. Upon the execution of these jobs, output data generated by the imaging device 104 can be transmitted to the control computing device 105 for further analysis and use. The user computing device 102 may comprise one or more operator workstations, and may include one or more processors 108, one or more memories 110, a networking interface 112, an input/output (I/O) interface 114, and a smart imaging application 116. Similarly, the control computing device 105 may include one or more processors 158, one or more memories 160, a networking interface 162, an input/output (I/O) interface 164, and software, potentially executing in the form of firmware and/or as a smart application 166, which may the same or different from smart imaging application 116.

The imaging device 104 is connected to the user computing device 102 via a network 106 (e.g., a private computer network, such as internal LAN, or, additionally or alternatively, a public computer network, such as the Internet), and is configured to interpret, execute, or otherwise implement machine vision jobs received from the user computing device 102. Generally, the imaging device 104 may obtain a job file containing one or more job scripts from the user computing device 102 across the network 106 that may define the machine vision job and may configure the imaging device 104 to capture and/or analyze images in accordance with the machine vision job. For example, the imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture an image of the target object in accordance with the configuration established via the one or more job scripts. Once captured and/or analyzed, the imaging device 104 may transmit the images and any associated data across the network 106 to the user computing device 102 for further analysis and/or storage. In various aspects, the imaging device 104 may be a "smart" camera (e.g., such as the VS70 MACHINE VISION SMART CAMERA device) and/or may otherwise be configured to automatically perform sufficient functionality of the imaging device 104 in order to obtain, interpret, and execute job scripts that define machine vision jobs, such as any one or more job scripts contained in one or more job files as obtained, for example, from the user computing device 102.

Broadly, a job file may be a JSON representation/data format of the one or more job scripts transferrable from the user computing device 102 to the imaging device 104. As used herein, a job script may also comprise or be referred to as a configuration file or a "job configuration." The job file may further be loadable/readable by a C++ runtime engine, or other suitable runtime engine, executing on the imaging device 104. Moreover, the imaging device 104 may run or implement a server (not shown) configured to listen for and receive job files across the network 106 from the user computing device 102. Additionally or alternatively, the server configured to listen for and receive job files may be implemented as one or more cloud-based servers, such as a cloud-based computing platform. For example, the server may be any one or more cloud-based platform(s) such as MICROSOFT AZURE, AMAZON AWS, or the like.

In various aspects, the imaging device 104 may include one or more processors 118, one or more memories 120, a networking interface 122, an I/O interface 124, and an imaging assembly 126. The imaging assembly 126 may include a digital camera and/or digital video camera for capturing or taking digital images and/or frames. Each digital image may comprise pixel data that may be analyzed by one or more tools each configured to perform an image analysis task. The digital camera and/or digital video camera of, e.g., the imaging assembly 126 may be configured, as disclosed herein, to take, capture, or otherwise generate digital images and, at least in some aspects, may store such images in a memory (e.g., one or more memories 110, 120, and/or 160) of a respective device (e.g., user computing device 102, imaging device 104).

By way of example, imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various aspects, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some aspects, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various aspects, the imaging assembly 126 may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data.

In various aspects, imaging assembly 126 may be configured to capture images of surfaces or areas of a predefined search space or target objects within the predefined search space. For example, each tool included in a job script may additionally include a region of interest (ROI) corresponding to a specific region or a target object imaged by the imaging assembly 126. The composite area defined by the ROIs for all tools included in a particular job script may thereby define the predefined search space which the imaging assembly 126 may capture in order to facilitate the execution of the job script. However, the predefined search space may be user-specified to include a field of view (FOV) featuring more or less than the composite area defined by the ROIs of all tools included in the particular job script. It should be noted that the imaging assembly 126 may capture 2D and/or 3D image data/datasets of a variety of areas, such that additional areas in addition to the predefined search spaces are contemplated herein. Moreover, in various aspects, the imaging assembly 126 may be configured to capture other sets of image data in addition to the 2D/3D image data, such as grayscale image data or amplitude image data, each of which may be depth-aligned with the 2D/3D image data.

The imaging device 104 may also process the 2D image data/datasets and/or 3D image datasets for use by other devices (e.g., the user computing device 102, an external server). For example, the one or more processors 118 may process the image data or datasets captured, scanned, or sensed by the imaging assembly 126. The processing of the image data may generate post-imaging data that may include metadata, simplified data, normalized data, result data, status data, or alert data as determined from the original scanned or sensed image data. The image data and/or the post-imaging data may be sent to the user computing device 102 executing the smart imaging application 116 for viewing, manipulation, and/or otherwise interaction. In other aspects, the image data and/or the post-imaging data may be sent to a server for storage or for further manipulation. As described herein, the user computing device 102, imaging device 104, and/or external server or other centralized processing unit and/or storage may store such data, and may also send the image data and/or the post-imaging data to another application implemented on a user device, such as a mobile device, a tablet, a handheld device, or a desktop device.

Each of the one or more memories 110, 120, and/or 160 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., smart imaging application 116, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118, and/or 158 (e.g., working in connection with the respective operating system in the one or more memories 110, 120, and/or 160) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 110, 120, and/or 160 may store an operating system (OS) (e.g., Microsoft Windows, Linux, Unix, etc.) capable of facilitating the functionalities, apps, methods, or other software as discussed herein. The one or more memories 110 may also store the smart imaging application 116, which may be configured to enable machine vision job construction, as described further herein. Additionally, or alternatively, the smart imaging application 116 may also be stored in the one or more memories 120 of the imaging device 104, and/or in an external database (not shown), which is accessible or otherwise communicatively coupled to the user computing device 102 via the network 106. The one or more memories 110, 120, and/or 160 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the smart imaging application 116, where each may be configured to facilitate their various functionalities discussed herein. It should be appreciated that one or more other applications may be envisioned and that are executed by the one or more processors 108, 118, and/or 158.

The one or more processors 108, 118, and/or 158 may be connected to the one or more memories 110, 120, and/or 160 via a computer bus responsible for transmitting electronic data, data packets, or otherwise electronic signals to and from the one or more processors 108, 118, and/or 158 and one or more memories 110, 120, and/or 160 in order to implement or perform the machine readable instructions, methods, processes, elements or limitations, as illustrated, depicted, or described for the various flowcharts, illustrations, diagrams, figures, and/or other disclosure herein.

The one or more processors 108, 118, and/or 158 may interface with the one or more memories 110, 120, and/or 160 via the computer bus to execute the operating system (OS). The one or more processors 108, 118, and/or 158 may also interface with the one or more memories 110, 120, and/or 160 via the computer bus to create, read, update, delete, or otherwise access or interact with the data stored in the one or more memories 110, 120, and/or 160 and/or external databases (e.g., a relational database, such as Oracle, DB2, MySQL, or a NoSQL based database, such as MongoDB). The data stored in the one or more memories 110, 120, and/or 160 and/or an external database may include all or part of any of the data or information described herein, including, for example, machine vision job images (e.g., images captured by the imaging device 104 in response to execution of a job script) and/or other suitable information.

The networking interfaces 112, 122, and/or 162 may be configured to communicate (e.g., send and receive) data via one or more external/network port(s) to one or more networks or local terminals, such as network 106, described herein. In some aspects, networking interfaces 112, 122, and/or 162 may include a client-server platform technology such as ASP.NET, Java J2EE, Ruby on Rails, Node.js, a web service or online API, responsive for receiving and responding to electronic requests. The networking interfaces 112, 122, and/or 162 may implement the client-server platform technology that may interact, via the computer bus, with the one or more memories 110, 120, and/or 160 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some aspects, the networking interfaces 112, 122, and/or 162 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some aspects, network 106 may comprise a private network or local area network (LAN). Additionally or alternatively, network 106 may comprise a public network such as the Internet. In some aspects, the network 106 may comprise routers, wireless switches, or other such wireless connection points communicating to the user computing device 102 (via the networking interface 112) and the imaging device 104 (via networking interface 122) via wireless communications based on any one or more of various wireless standards, including by non-limiting example, IEEE 802.11a/b/c/g (WIFI), the BLUETOOTH standard, or the like.

The I/O interfaces 114, 124, and/or 164 may include or implement operator interfaces configured to present information to an administrator or operator and/or receive inputs from the administrator or operator. An operator interface may provide a display screen (e.g., via the user computing device 102 and/or imaging device 104) which a user/operator may use to visualize any images, graphics, text, data, features, pixels, and/or other suitable visualizations or information. For example, the user computing device 102 and/or imaging device 104 may comprise, implement, have access to, render, or otherwise expose, at least in part, a graphical user interface (GUI) for displaying images, graphics, text, data, features, pixels, and/or other suitable visualizations or information on the display screen. The I/O interfaces 114, 124, and/or 164 may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the user computing device 102 and/or the imaging device 104. According to some aspects, an administrator or user/operator may access the user computing device 102 and/or imaging device 104 to construct jobs, review images or other information, make changes, input responses and/or selections, and/or perform other functions.

As described above herein, in some aspects, the user computing device 102 may perform the functionalities as discussed herein as part of a "cloud" network or may otherwise communicate with other hardware or software components within the cloud to send, retrieve, or otherwise analyze data or information described herein.

Figure 2:
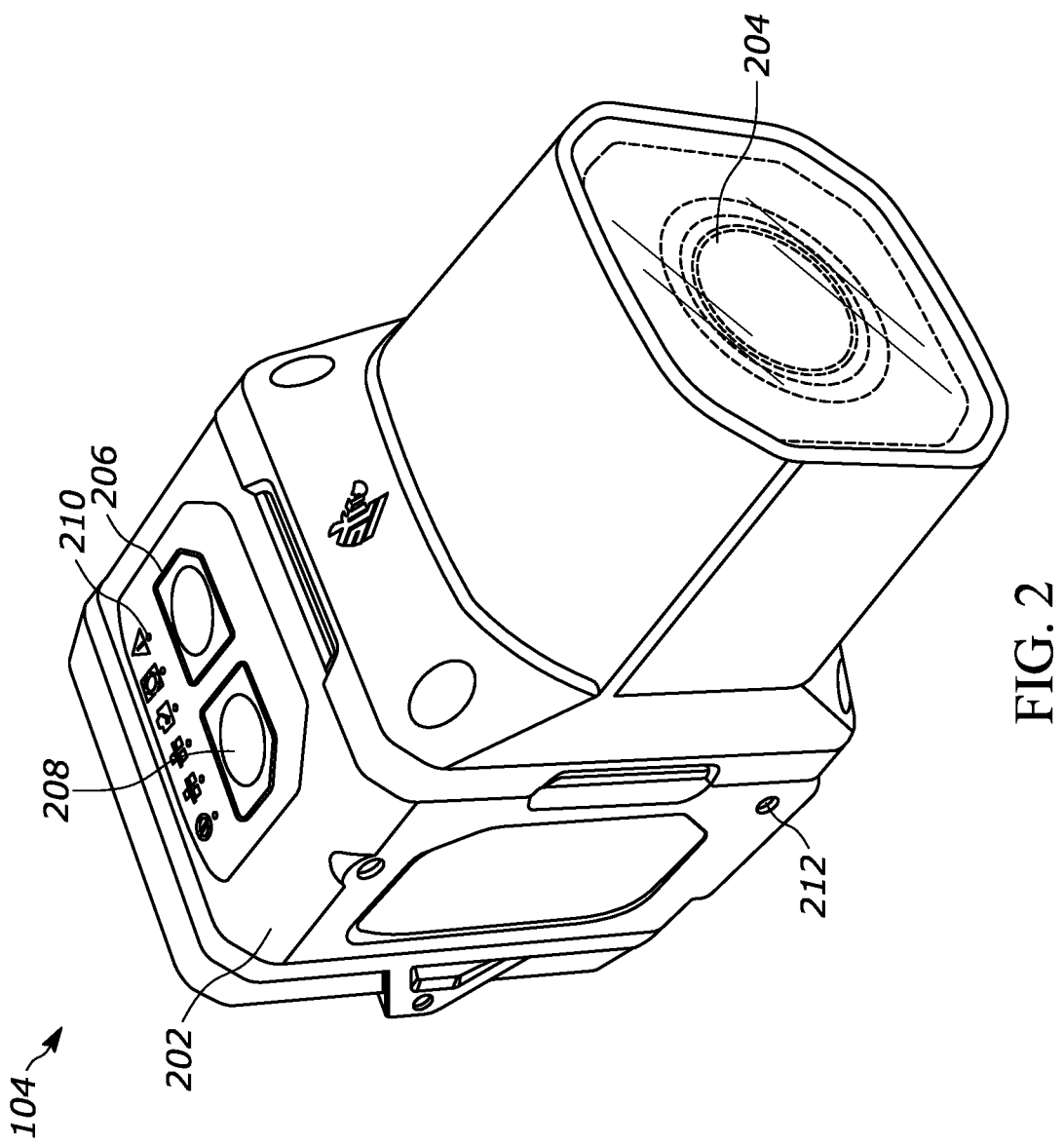
FIG. 2 is a perspective view of the imaging device of FIG. 1, in accordance with aspects described herein.

FIG. 2 is a perspective view of the imaging device 104 of FIG. 1, in accordance with aspects described herein. By way of non-limiting example, FIG. 2 is representative of a VS70 MACHINE VISION SMART CAMERA device as described herein for FIG. 1. The imaging device 104 includes a housing 202, an imaging aperture 204, a user interface label 206, a dome switch/button 208, one or more light emitting diodes (LEDs) 210, and mounting point(s) 212. As previously mentioned, the imaging device 104 may obtain job files from a user computing device (e.g., user computing device 102) which the imaging device 104 thereafter interprets and executes. The instructions included in the job file may include device configuration settings (also referenced herein as "imaging settings") operable to adjust the configuration of the imaging device 104 prior to capturing images of a target object.

For example, the device configuration settings may include instructions to adjust one or more settings related to the imaging aperture 204. As an example, assume that at least a portion of the intended analysis corresponding to a machine vision job requires the imaging device 104 to maximize the brightness of any captured image. To accommodate this requirement, the job file may include device configuration settings to increase the aperture size of the imaging aperture 204. The imaging device 104 may interpret these instructions (e.g., via one or more processors 118) and accordingly increase the aperture size of the imaging aperture 204. Thus, the imaging device 104 may be configured to automatically adjust its own configuration to optimally conform to a particular machine vision job. Additionally, the imaging device 104 may include or otherwise be adaptable to include, for example but without limitation, one or more bandpass filters, one or more polarizers, one or more DPM diffusers, one or more C-mount lenses, and/or one or more C-mount liquid lenses over or otherwise influencing the received illumination through the imaging aperture 204.

The user interface label 206 may include the dome switch/button 208 and one or more LEDs 210, and may thereby enable a variety of interactive and/or indicative features. Generally, the user interface label 206 may enable a user to trigger and/or tune to the imaging device 104 (e.g., via the dome switch/button 208) and to recognize when one or more functions, errors, and/or other actions have been performed or taken place with respect to the imaging device 104 (e.g., via the one or more LEDs 210). For example, the trigger function of a dome switch/button (e.g., dome/switch button 208) may enable a user to capture an image using the imaging device 104 and/or to display a trigger configuration screen of a user application (e.g., smart imaging application 116). The trigger configuration screen may allow the user to configure one or more triggers for the imaging device 104 that may be stored in memory (e.g., one or more memories 110, 120, and/or 160) for use in later developed machine vision jobs, as discussed herein.

As another example, the tuning function of a dome switch/button (e.g., dome/switch button 208) may enable a user to automatically and/or manually adjust the configuration of the imaging device 104 in accordance with a preferred/predetermined configuration and/or to display an imaging configuration screen of a user application (e.g., smart imaging application 116). The imaging configuration screen may allow the user to configure one or more configurations of the imaging device 104 (e.g., aperture size, exposure length, etc.) that may be stored in memory (e.g., one or more memories 110, 120, and/or 160) for use in later developed machine vision jobs, as discussed herein.

To further this example, and as discussed further herein, a user may utilize the imaging configuration screen (or more generally, the smart imaging application 116) to establish two or more configurations of imaging settings for the imaging device 104. The user may then save these two or more configurations of imaging settings as part of a machine vision job that is then transmitted to the imaging device 104 in a job file containing one or more job scripts. The one or more job scripts may then instruct the imaging device 104 processors (e.g., one or more processors 118) to automatically and sequentially adjust the imaging settings of the imaging device in accordance with one or more of the two or more configurations of imaging settings after each successive image capture.

The mounting point(s) 212 may enable a user connecting and/or removably affixing the imaging device 104 to a mounting device (e.g., imaging tripod, camera mount, etc.), a structural surface (e.g., a warehouse wall, a warehouse ceiling, structural support beam, etc.), other accessory items, and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through the imaging device's 104 FOV. Moreover, the mounting point(s) 212 may enable a user to connect the imaging device 104 to a myriad of accessory items including, but without limitation, one or more external illumination devices, one or more mounting devices/brackets, and the like.

In addition, the imaging device 104 may include several hardware components contained within the housing 202 that enable connectivity to a computer network (e.g., network 106). For example, the imaging device 104 may include a networking interface (e.g., networking interface 122) that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Ethernet/IP, PROFINET, Modbus TCP, CC-Link, USB 3.0, RS-232, and/or any other suitable communication protocol or combinations thereof.

Figure 3:
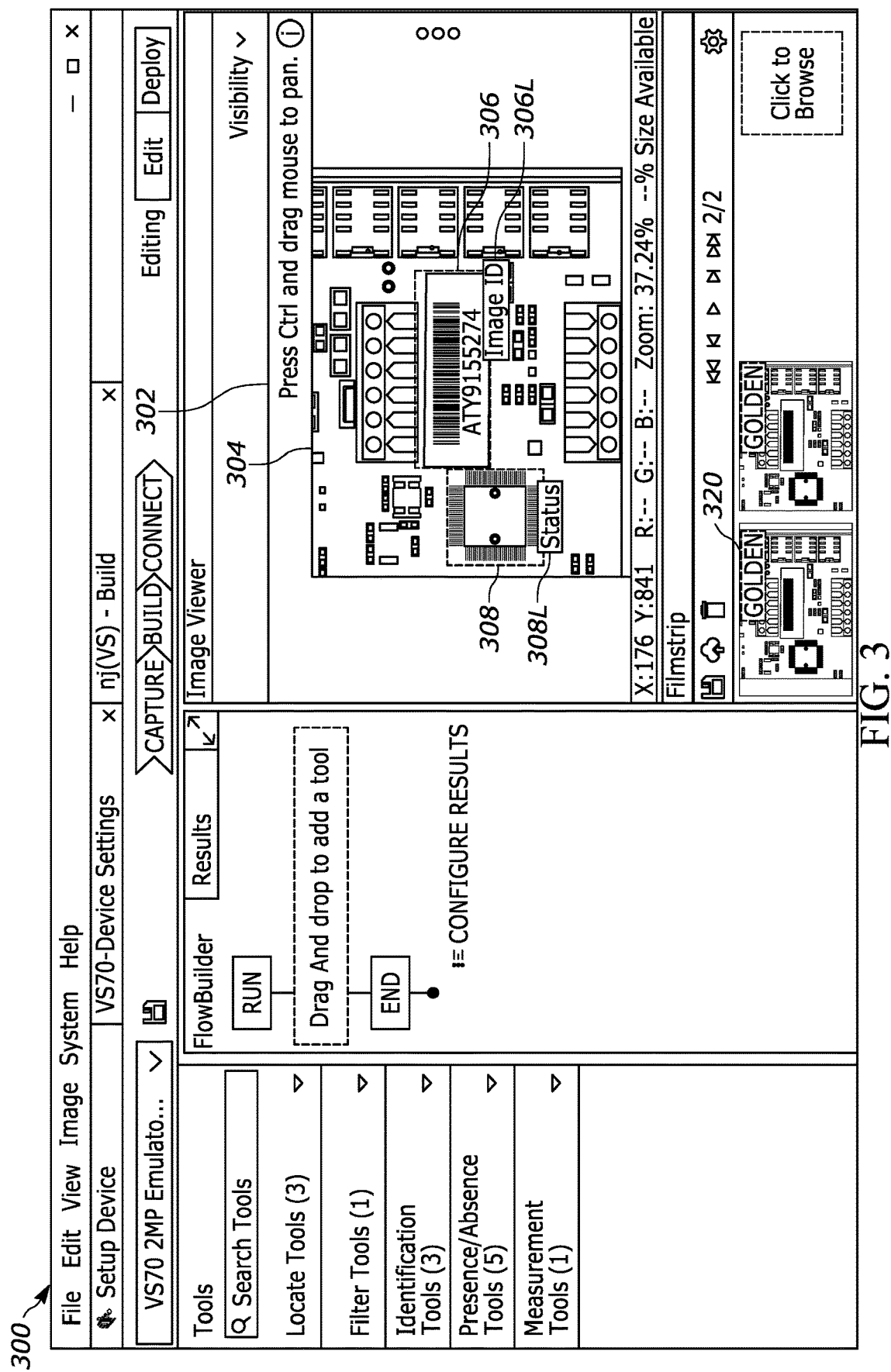
FIG. 3 depicts an example application interface utilized in connection with the operation of the machine vision system of FIG. 1, in accordance with aspects described herein.

FIG. 3 depicts an example application interface 300 utilized in connection with the operation of the machine vision system of FIG. 1, in accordance with aspects described herein. As shown in the example of FIG. 3, image 302 is loaded into and/or displayed in application interface 300. Application interface 300 may load images that may be, or that may be ready to be (not yet), annotated, marked, or otherwise manipulated to have regions of interest(s) (ROIs) associated with the image. Such ROIs may be used for training machine learning models and/or otherwise configuring imaging device 104 to implement machine vision jobs as described herein. In some aspects, application interface 300 may also store and/or load additional images 320 that may be used for training, testing, and/or application, e.g., by already trained machine vision models, etc.

In the example of FIG. 3, image 302 shows an image of a computer circuit board, which is an example of a manufactured product that may be imaged by imaging device 104. Image 302 may be manipulated or otherwise interacted with by a user. As illustrated, image 302 depicts ROIs 306 and 308. ROI 306 contains a barcode associated with the computer circuit board of image 302. ROI 308 contains a portion of the computer circuit board, for example, an area or region where a computer chip is installed (or should be installed) on the computer circuit board of image 302.

It should be appreciated that an ROI may be any shape desirable and may be obtained in any way, be it manual or automatic. For example, while each illustrated ROI is shown as having a rectangular shape, an ROI may have, for example, a circular, square, ellipsoidal, octagonal, or any other desired shape. Additionally, an ROI does not have to be symmetrical about any line and an ROI may have an all-together irregular shape. With respect to generating the ROI, it may be generated manually by a user selecting a point in the image 302 with a mouse and dragging the pointer from that point while activating the ROI function to draw an ROI of desired proportions, or is may be generated based on the results of image analysis performed by the application and/or the imaging device. For instance, the system may be configured to generate an ROI around an area within the image having a pixel brightness value above or below a threshold, it may be configured to generate an ROI based on edge detection, and it may be configured to generate an ROI based on color detection, and so on.

Additionally, each ROI may have a label (e.g., label 306L for ROI 306 and label 308L for ROI 308), displayed on the screen, providing some identifying information. Such identifying information may include, by way of non-limiting example, information identifying or representing a feature or feature(s) in the image, an approach that was used to generate the ROI, or other such information corresponding to the ROI. In the example of FIG. 3, label 306L defines ROI 306 as an image identifier (ID) (e.g., where the barcode shown in ROI 306 comprises a barcode). Similarly, label 308L defines ROI 308 as a status (e.g., where the computer chip shown in ROI 308 has a status, e.g., including a success or failure status for indicating whether or not the computer chip is depicted in a success state (e.g., depicted with no defects) or a failure state (e.g., depicted with defects, missing, etc.)).

When one or more ROIs are present, the following approach may be applied to in order to determine which ROI should be affected in response to a user action. For example, the following logic may be applied:
If a mouse pointer is over an ROI label, the ROI associated with the label is targeted for interaction.
Otherwise, if a pointer is within the body of a single ROI, the ROI within which the mouse pointer is found if targeted for interaction.
Otherwise, if the pointer is within the body of multiple ROIs, target the ROI whose center is closest to the location of the pointer.
In the event that the pointer is equidistant to multiple ROI centers, target the smallest ROI for interaction.

Once an ROI is targeted, it can be selected by clicking or can be moved by dragging. As the pointer moves on the canvas displaying the image 302, the targeted ROI can be highlighted with a translucent overlay so the user knows with which ROI they would be interacting given the current pointer position.

Such center-distance logic allows users to target the desired ROI out of a group of overlapping ones, once the user becomes used to the convention.

In other aspects, the following logic is applied:
If the pointer is over an ROI label, the ROI associated with the label is targeted for interaction.
Otherwise, if the pointer is within the body of a single ROI, the ROI within which the mouse pointer is found if targeted for interaction.
Otherwise, if the pointer is within the body of multiple ROIs, target the ROI whose border is closest to the pointer.
In the case where the pointer is equidistant to multiple ROI borders, distance to center and/or ROI size are used as tiebreakers. Thus, targeted ROI would be one whose center is closest to the location of the pointer and/or one that is smallest in size.

The border of an ROI can be a visible element of an otherwise transparent ROI body, so it can serve as an anchor for targeting than the invisible center. Even though the thin border would likely require too much pointing accuracy to serve as a target by itself, users can follow the convention of pointing to the inside of the ROI body near the border, which is efficient since it requires less pointing accuracy.

Overlapping ROI Interaction Settings may be added to switch between several different overlapping ROI targeting mode options in case certain modes are more intuitive to certain users, or in case certain modes are better suited for certain use cases. The modes could include:
Dynamic targeting (closest center or closest border based on a configurable threshold)
Border targeting (closest border)
Center targeting (closest center)
Size targeting (smallest ROI)
Z-index targeting (selected or top ROI)

It should be appreciated that throughout this disclosure, references to input devices like a mouse should not be seen as limiting and other input devices should be considered to be within the scope of this disclosure. For example, it should be appreciated that in the event of the application being executed on a mobile device like a tablet or a notebook having touch-screen capabilities, a user's finger and the respective input functions via a screen may function just like the input functions of a computer mouse.

Figure 4:
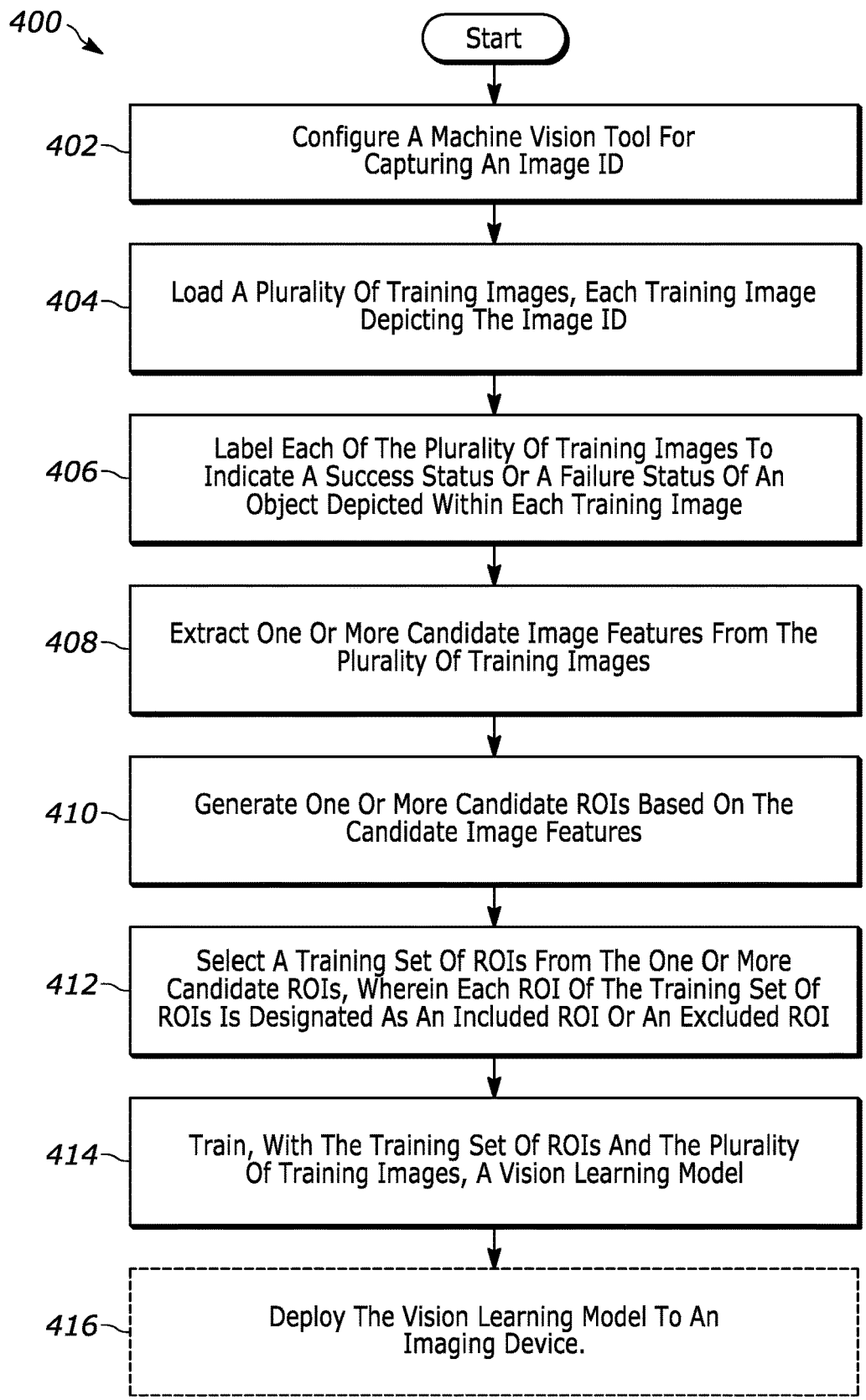
FIG. 4 is an example machine vision method for automatically generating one or more machine vision jobs based on ROIs of digital images, in accordance with aspects described herein.

FIG. 4 is an example machine vision method 400 for automatically generating one or more machine vision jobs based on ROIs of digital images, in accordance with aspects described herein. Machine vision jobs are deployable to, and implementable on, imaging camera (e.g., imaging device 104) such as any one or more of the VS-SERIES smart cameras as provided by ZEBRA TECHNOLOGIES CORP., such as the VS70 MACHINE VISION SMART CAMERA device. For example, in one aspect a machine vision job may be configured for deployment to an imaging camera to read or scan on an image of a barcode of a product, such as a computer circuit board as illustrated in FIG. 3. Generally, machine vision method 400 represents an algorithm executable by one or more processors (e.g., processors 108, 118, and/or 158 of machine vision system 100) and that may implemented as computing instructions stored on a tangible, non-transitory computer-readable medium (e.g., a computer readable medium) as described herein.

With reference to FIG. 4, at block 402, machine vision method 400 comprises configuring a machine vision tool for capturing an image ID. For example, in the example of FIG. 4, application interface 300 may be used to create an empty project with a single configured tool to capture a barcode representing the image ID. The machine vision tool may be configured to operate, access, or execute an OCR reader, bar reader, image analysis (e.g., count number of pixels in region), as performed by imaging device 104 or other component as described for machine vision system 100, where each tool performs a specific processing function.

At block 404, machine vision method 400 comprises loading a plurality of training images (e.g., a training set of images), each training image depicting the image ID; The plurality of training images may be selected or stored in a folder or library (e.g., additional images 320) containing a series of captured images for the project. Each image may be read and identified according to the captured image ID.

At block 406, machine vision method 400 comprises labeling each of the plurality of training images to indicate a success status or a failure status of an object depicted within each training image. For example, in some aspects, configuring a machine vision job may include selecting ROIs in the image, such as a computer chip location (e.g., ROI 308), to label (e.g., label 308L) and indicate success (e.g., a success status) or a failure (e.g., a failure status).

In some aspects, images may be stored in memory (e.g., one or more memories 110, 120, and/or 160) or otherwise an image database is managed by the user. Images may either be marked with success or failure status. For example, if a component (e.g., computer chip) is found to be defective in the field (e.g., in a manufacturing facility) or by testing, it is marked as a failure status in the ROI (e.g., ROI 308). By default, it is assumed that each image that is not marked as failure is an example of a success, but this can be configured by user preference, e.g., via application interface 300. In some aspects, an indication of success may comprise quality control. For example, an indication of success may comprise an indication that a specific product or component (e.g., computer circuit board and/or computer chip as shown for image 302) passed quality control. The product may be identified by the image ID (e.g., barcode in ROI 306).

A failure status may be indicated by a failure to read a barcode or a quality control failure (e.g., scanning or imaging a computer circuit board reveals or indicates failure of quality control such as leads on the circuit board are not connected, a computer chip is missing, etc.). In such aspects, the barcode (e.g., as identified in ROI 306) can uniquely identify which product failed. In some aspects, one or more training images of the plurality of training images may be labeled (e.g., label 308L) to indicate a failure status, where such labeling may include a graphical bounded area (e.g., ROI 308) to indicate a visually defective area or portion of the object depicted within the training image. For example, when marking an image (e.g., image 302) to represent or indicate a failure status or state, a user can draw a polygon around visually defective area(s) to help the learning process identify the failing region (e.g., ROI 308, where for example, a computer chip may be missing from the computer circuit board depicted in image 302).

With reference to FIG. 4, at block 408, machine vision method 400 comprises extracting one or more candidate image features from the plurality of training images. Each image may be read and identified according to the captured image ID (e.g., a barcode as shown in ROI 306). Candidate features may be extracted and cross compared from the image collection to generate a series of candidate regions (e.g., ROI 308 depicting a computer chip or related area) for the job. The candidate features may correspond to the success and/or failure indications as previously indicated.

At block 402, machine vision method 400 comprises generating one or more candidate ROIs (e.g., ROI 308) based on the candidate image features.

At block 412, machine vision method 400 comprises selecting a training set of ROIs from the one or more candidate ROIs, wherein each ROI of the training set of ROIs is designated as an included ROI or an excluded ROI. In this way, ROIs can be defined to either include or exclude specific areas from the learning process. For example, specific areas/ROIs of a circuit board may include ROIs defining areas that are susceptible to image (e.g., important leads or areas that quality control issues typically arise). By contrast, excluded areas could include areas that differ (and therefore are not indicative of quality, such as a different processor type (INTEL or AMD). Such candidate region may then be presented to a user, e.g., via example application interface 300, such that the user may select whether such regions are to be included or excluded from the project. If the region type can be determined from the content across images, as is the case for barcodes and OCR, default values are entered to correctly configure the new tool. In this way, application interface 300 provides an automated or assisted way to implement supervised learning and training of images by flagging possible important image features to select from and that may be used to train a vision learning model, for example as described for block 414.

At block 414, machine vision method 400 comprises training, with the training set of ROIs and the plurality of training images, a vision learning model. The vision learning model may be configured to output a machine vision job. That is, the images as annotated or selected with included and/or included ROIs and/or success or failure statuses may be trained with a machine learning algorithm to generate or output a machine vision job based on the example training set of images. For each image, candidate (success) features may extracted, and cross compared with the failure sets. In this way, machine vision method 400 comprises, automatically, a job that would otherwise be created manually.

In various aspects, the vision learning model may be trained using a supervised or unsupervised machine learning program or algorithm. The machine learning program or algorithm may employ a neural network, which may be a convolutional neural network, a deep learning neural network, or a combined learning module or program that learns in two or more features or feature datasets in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. Machine learning may involve identifying and recognizing patterns in existing data (such as pixels within labeled or otherwise identified ROIs) in order to facilitate making predictions or output for subsequent data (outputting machine vision jobs for predicting or otherwise detecting similar ROIs in additional or like images).

Machine learning model(s), such as those as vision learning model, may be created and trained based upon example (e.g., "training data,") inputs or data (which may be termed "features" and "labels") in order to make valid and reliable predictions for new inputs, such as testing level or production level data or inputs.

In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated.

Supervised learning and/or unsupervised machine learning may also comprise retraining, relearning, or otherwise updating models with new, or different, information, which may include information received, ingested, generated, or otherwise used over time. The disclosures herein may use one or both of such supervised or unsupervised machine learning techniques.

For example, with respect to the example of FIG. 3, image 302 may comprise a training image that indicates that ROI 308 is a failure status for having non-connecting electrical leads or whether the computer chip is fractured, missing, etc. Once trained, vision learning model may be able to detect similar defects in new or additional images.

In additional aspects, the vision learning model is further trained, with the training set of ROIs and the plurality of training images, to output a quality score indicating a quality of the object depicted in the training image. For example, the computer circuit board may have a lower quality score based on defects.

In some aspects, at least one of the training set of ROIs may comprise a critical ROI. The critical ROI may cause the vision learning model to output at least one of: (a) a quality score indicating high quality for the object depicted in the training image or (b) a quality score indicating a low quality for the object depicted in the training image. In such aspects, training the vision learning model may comprise identifying critical pattern ROIs to be added to the training images. Generally, a critical pattern may automatically identify an ROI where the model produces a high score among all passing instances, and a low score among failing instances.

For the example of FIG. 3, a failing instance of a computer circuit board may comprise an ROI of the circuit board where a crack is most likely, or where a missing processor or chip on circuit board is typically found (but is missing or partially missing), where any other component is typically not soldered correctly, or where a capacitor is blown (e.g., brown at the top), etc., or any other failure or issues experienced or known to occur during or after the manufacturing process of the product. In some aspects, an ideal critical pattern would be an ROI that matched at 100% for all passing instances, and 0% for all failing instances (i.e., an ROI that indicates a 100% pass or 100% fail).

In some aspects, the vision learning model may comprise an ensemble model that includes a plurality of artificial intelligence models. In such aspects, each of the plurality of artificial intelligence models may be trained with subsets of the training set of ROIs to output quality scores for specific ROIs within a digital image depicting the object. In such aspects, training images having ROIs and/or critical patterns may be used to train an ensemble model, which may include additional training or learning, such as boosting, utilizing the ROIs as weak learners to produce an improved vision learning model for the given machine vision job. The model output from this process can then assign a defect score to new or additional example images offered by the camera.

More generally, a vision learning model may comprise multiple machine learning learning models each trained on, and configured to detect, different ROIs for each image. In such aspects, each model may be configured to analyze at a single ROI (each ROI having specific pixels), where each model can output a predictive score. Scores can be averaged for an overall or an ensemble score. Some models may be segmented models, using unsupervised learning.

With reference to FIG. 4, at block 416, machine vision method 400 may comprise deploying the vision learning model. For example, machine vision job may configured for electronic deployment to an imaging device (e.g., imaging device 104). In such aspects, the imaging device (e.g., imaging device 104), implementing the machine vision job, can be configured to detect the success status or the failure status of additional images depicting the object (e.g., the computer circuit board) as the object remains stationary or as it moves on a conveyor belt, etc. during a manufacturing process to detect quality control and/or other issues of the object or product.

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific aspects have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described aspects/examples/implementations should not be interpreted as mutually exclusive, and should instead be understood as potentially combinable if such combinations are permissive in any way. In other words, any feature disclosed in any of the aforementioned aspects/examples/implementations may be included in any of the other aforementioned aspects/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting aspect the term is defined to be within 10%, in another aspect within 5%, in another aspect within 1% and in another aspect within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various aspects for the purpose of streamlining the disclosure. This method of disclosure is not to be interpreted as reflecting an intention that the claimed aspects require more features than are expressly recited in each claim. Rather, as the following claims reflect, inventive subject matter may lie in less than all features of a single disclosed aspect. Thus, the following claims are hereby incorporated into the Detailed Description, with each claim standing on its own as a separately claimed subject matter.

The invention claimed is:

1. A machine vision method for automatically generating one or more machine vision jobs based on region of interests (ROIs) of digital images, the machine vision method comprising:
   configuring a machine vision tool for capturing an image identifier (ID);
   loading a plurality of training images, each training image depicting the image ID;
   labeling each of the plurality of training images to indicate a success status or a failure status of an object depicted within each training image;
   extracting one or more candidate image features from the plurality of training images;
   generating one or more candidate ROIs based on the candidate image features;
   selecting a training set of ROIs from the one or more candidate ROIs, wherein each ROI of the training set of ROIs is designated as an included ROI or an excluded ROI; and
   training, with the training set of ROIs and the plurality of training images, a vision learning model, wherein the vision learning model is configured to output a machine vision job, wherein the machine vision job is configured for electronic deployment to an imaging device, and wherein the imaging device, implementing the machine vision job, is configured to detect the success status or the failure status of additional images depicting the object.

2. The machine vision method of claim 1, wherein labeling a training image of the plurality of training images to indicate a failure status comprises including a graphical bounded area to indicate a visually defective area or portion of the object depicted within the training image.

3. The machine vision method of claim 1, wherein the vision learning model is further trained, with the training set of ROIs and the plurality of training images, to output a quality score indicating a quality of the object depicted in the training image.

4. The machine vision method of claim 3, wherein at least one of the training set of ROIs comprises a critical ROI, the critical ROI causing the vision learning model to output at least one of: (a) the quality score indicating high quality for the object depicted in the training image or (b) the quality score indicating a low quality for the object depicted in the training image.

5. The machine vision method of claim 1, wherein the vision learning model is an ensemble model comprising a plurality of artificial intelligence models, wherein each of the plurality of artificial intelligence models is trained with subsets of the training set of ROIs to output quality scores for specific ROIs within a digital image depicting the object.

6. A machine vision system configured to automatically generate one or more machine vision jobs based on region of interests (ROIs) of digital images, the machine vision system comprising:

an imaging device configured to implement one or more machine vision jobs;

one or more processors; and a memory communicatively coupled to the one or more processors and storing computing instructions that when executed by the one or more processors, cause the one or more processors to:

configure a machine vision tool for capturing an image identifier (ID), load a plurality of training images, each training image depicting the image ID, label each of the plurality of training images to indicate a success status or a failure status of an object depicted within each training image, extract one or more candidate image features from the plurality of training images, generate one or more candidate ROIs based on the candidate image features, select a training set of ROIs from the one or more candidate ROIs, wherein each ROI of the training set of ROIs is designated as an included ROI or an excluded ROI, and train, with the training set of ROIs and the plurality of training images, a vision learning model, wherein the vision learning model is configured to output a machine vision job, wherein the machine vision job is configured for electronic deployment to the imaging device, and wherein the imaging device, implementing the machine vision job, is configured to detect the success status or the failure status of additional images depicting the object.

7. The machine vision system of claim 6, wherein labeling a training image of the plurality of training images to indicate a failure status comprises including a graphical bounded area to indicate a visually defective area or portion of the object depicted within the training image.

8. The machine vision system of claim 6, wherein the vision learning model is further trained, with the training set of ROIs and the plurality of training images, to output a quality score indicating a quality of the object depicted in the training image.

9. The machine vision system of claim 8, wherein at least one of the training set of ROIs comprises a critical ROI, the critical ROI causing the vision learning model to output at least one of: (a) the quality score indicating high quality for the object depicted in the training image or (b) the quality score indicating a low quality for the object depicted in the training image.

10. The machine vision system of claim 6, wherein the vision learning model is an ensemble model comprising a plurality of artificial intelligence models, wherein each of the plurality of artificial intelligence models is trained with subsets of the training set of ROIs to output quality scores for specific ROIs within a digital image depicting the object.

11. A tangible, non-transitory computer-readable medium storing computing instructions for automatically generating one or more machine vision jobs based on region of interests (ROIs) of digital images, that when executed by one or more processors cause the one or more processors to:

configure a machine vision tool for capturing an image ID;

load a plurality of training images, each training image depicting the image identifier (ID);

label each of the plurality of training images to indicate a success status or a failure status of an object depicted within each training image;

extract one or more candidate image features from the plurality of training images;

generate one or more candidate ROIs based on the candidate image features;

select a training set of ROIs from the one or more candidate ROIs, wherein each ROI of the training set of ROIs is designated as an included ROI or an excluded ROI; and train, with the training set of ROIs and the plurality of training images, a vision learning model, wherein the vision learning model is configured to output a machine vision job, wherein the machine vision job is configured for electronic deployment to an imaging device, and wherein the imaging device, implementing the machine vision job, is configured to detect the success status or the failure status of additional images depicting the object.

12. The tangible, non-transitory computer-readable medium of claim 11, wherein labeling a training image of the plurality of training images to indicate a failure status comprises including a graphical bounded area to indicate a visually defective area or portion of the object depicted within the training image.

13. The tangible, non-transitory computer-readable medium of claim 11, wherein the vision learning model is further trained, with the training set of ROIs and the plurality of training images, to output a quality score indicating a quality of the object depicted in the training image.

14. The tangible, non-transitory computer-readable medium of claim 13, wherein at least one of the training set of ROIs comprises a critical ROI, the critical ROI causing the vision learning model to output at least one of: (a) the quality score indicating high quality for the object depicted in the training image or (b) the quality score indicating a low quality for the object depicted in the training image.

15. The tangible, non-transitory computer-readable medium of claim 11, wherein the vision learning model is an ensemble model comprising a plurality of artificial intelligence models, wherein each of the plurality of artificial intelligence models is trained with subsets of the training set of ROIs to output quality scores for specific ROIs within a digital image depicting the object.

* * * * *